United States Patent [19]
Dach et al.

[11] 3,938,410
[45] Feb. 17, 1976

[54] HYDRAULIC ACTUATING SYSTEM FOR A PAIR OF CONCURRENTLY OPERATING CLUTCHES OR BRAKES

[75] Inventors: Hansjörg Dach; Horst Furtner, both of Friedrichshafen; Robert Marion, Lindau, all of Germany

[73] Assignee: Zahnradfabrik Friedrichshafen Aktiengesellschaft, Friedrichshafen, Germany

[22] Filed: Sept. 7, 1973

[21] Appl. No.: 395,364

[30] Foreign Application Priority Data
Sept. 8, 1972 Germany.......................... 2244193

[52] U.S. Cl.................... 74/869; 74/867; 74/752 C
[51] Int. Cl.......................... F16h 3/44; B60k 41/18
[58] Field of Search ............. 74/753, 867, 868, 865, 74/1, 869, 752 A, 752 C, 752 D

[56] References Cited
UNITED STATES PATENTS

| | | | |
|---|---|---|---|
| 3,369,430 | 2/1968 | Haley.................. | 74/867 X |
| 3,453,908 | 7/1969 | Iijima................... | 74/867 |
| 3,494,223 | 2/1970 | Mori.................... | 74/869 X |
| 3,501,979 | 3/1970 | Forster et al. ........................ | 74/753 |
| 3,559,669 | 2/1971 | Dach............................ | 74/753 UX |
| 3,593,599 | 7/1971 | Dach............................ | 74/759 X |
| 3,610,070 | 10/1971 | Dach............................ | 74/753 |
| 3,670,599 | 6/1972 | Nagamatsu...................... | 74/753 X |
| 3,719,108 | 3/1973 | Sakai................................... | 74/869 |
| 3,726,157 | 4/1973 | Marumo ............................. | 74/753 |
| 3,747,439 | 7/1973 | Uozumi et al. ...................... | 74/869 |

*Primary Examiner*—Samuel Scott
*Assistant Examiner*—Lance W. Chandler
*Attorney, Agent, or Firm*—Karl F. Ross; Herbert Dubno

[57] ABSTRACT

Two concurrently operated hydraulic brakes of an automotive transmission, actuated in an intermediate-speed ("second gear") position, are filled under the control of a slide valve whose slider in a normal position admits fluid at high rate to both brakes and thereafter assumes an unstable throttling position in which the fluid pressure gradually builds up in them to a value causing an associated plunger to return the slider to normal. One of the brakes, which is only unidirectionally effective, remains actuated also upon an upshift into a high-speed position ("third gear") whereas the other, bidirectionally effective brake is released upon such upshift under the control of a shift valve which cuts off the fluid flow to the latter brake and establishes a drainage path therefor by passing the slide valve.

10 Claims, 3 Drawing Figures

HYDRAULIC ACTUATING SYSTEM FOR A PAIR OF CONCURRENTLY OPERATING CLUTCHES OR BRAKES

FIELD OF THE INVENTION

Our present invention relates to a hydraulic actuating system of the type disclosed in commonly owned U.S. Pat. No. 3,610,070 in which two fluid-operated clutches or brakes, acting as drive-establishing means for an automotive transmission, are concurrently operable under the control of a set of valves in response to manually or automatically generated speed-selection commands.

BACKGROUND OF THE INVENTION

The system specifically described in the above-identified patent comprises, as a first and a second drive-establishing means, a unidirectionally effective and a bidirectionally effective brake which are both filled with high-pressure hydraulic fluid upon an upshift from a low-speed position ("first gear") into an intermediate-speed position ("second gear"), the engagement of both brakes being moderated by a control valve which in its normal position admits fluid to them at a relatively high rate but which, upon incipient pressure buildup in the unidirectionally effective first brake, is moved by fluid feedback into an off-normal position resulting in a throttled flow. After the fluid pressure in the first brake (which at this stage is directly connected to the second brake) has reached a predetermined level, the normal position of the control valve is re-established by a force-increasing action of that fluid pressure upon a biasing member opposing the off-normal displacement of this valve. Thus, the two brakes are under full supply pressure as soon as the upshift into second gear is completed.

A further upshift into a high-speed position ("third gear") requires the release of the bidirectionally effective second brake. This release is brought about by the draining of the feeder line of that brake via the normally positioned control valve and a 2-3 shift valve in tandem therewith. In the event of a subsequent downshift to second gear, the first brake is already actuated so that only the second brake need be supplied with fluid; this occurs in response to a return of the 2-3 shift valve from an upshifting to a downshifting position, with no further intervention of the control valve in tandem therewith.

If the upshift into third gear occurs before the second-gear position is fully established, i.e. with the control valve still in its off-normal throttling position, the draining of the bidirectionally effective brake cannot take place immediately but must await the restoration of the control valve to normal. The resulting delay may lead to concurrent actuation of the two brakes and of a clutch effective in third gear only whereby, with these three drive-establishing means acting upon a common movable element (shaft) of a planetary-gear transmission, the system jams for brief periods during which the affected components are subjected to excessive stress.

OBJECTS OF THE INVENTION

The general object of our present invention is to provide an improved system of the type referred to in which shocks and strains due to inadmissible simultaneous actuation of several drive-establishing means are avoided.

A more particular object is to provide means in such a system for smoothing the upshift from second to third gear.

SUMMARY OF THE INVENTION

We realize these objects, in conformity with our present improvement, by the provision of drain means for the second drive-establishing means (specifically for the bidirectionally operating brake) effective in the blocking position of the 2-3 shift valve independently of the position of the associated control valve.

In accordance with a more particular feature of our invention, the feeder line for the second drive-establishing means (referred to hereinafter, for convenience, as a brake) is split into two sections, i.e. a first section extending from the control valve to a first port of another valve cylinder and a second section extending from a second port of that cylinder to the second brake. In the unblocking position of the 2-3 shift valve, a piston in the valve cylinder interconnects the two ports; in the blocking position, it obstructs the first port and connects the second port to a drain.

The piston and cylinder inserted in this feeder line may form part of the 2-3 shift valve or may be indirectly controlled thereby through the intermediary of a discharge port which communicates with the fluid-supply channel in the blocking position of this valve and applies fluid pressure, counteracting a restoring force, to the piston of the drain valve. In the latter case the same discharge port advantageously feeds a third drive-establishing means, namely the aforementioned clutch.

BRIEF DESCRIPTION OF THE DRAWING

The above and other features of our invention will now be described in detail with reference to the accompanying drawing in which.

SPECIFIC DESCRIPTION

Figure 1:
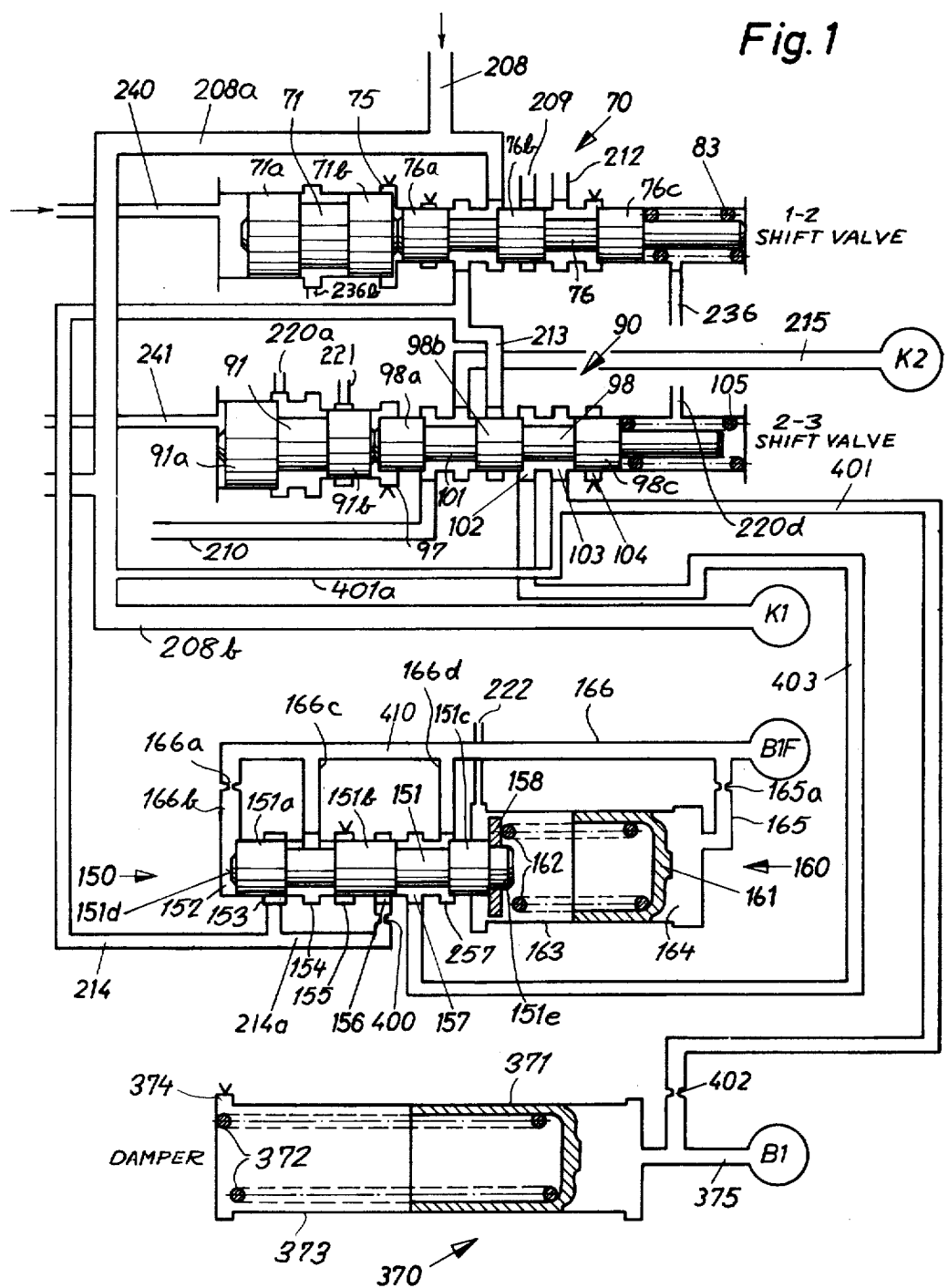
FIG. 1 is a longitudinal sectional view of a control system for an automotive transmission according to the invention, illustrated in an unstable position during upshifting from first to second gear.

Throughout the drawing, as far as practical, elements having counterparts in commonly owned U.S. Pat. No. 3,610,070 have been designated by the same reference characters.

The principal components of the system of FIG. 1 are a first shift valve 70 (for the 1-2 shift), a second shift valve 90 (for the 2-3 shift), a further or control valve 150, an associated damper 160, a pair of clutches K1, K2, a unidirectionally effective brake B1F and a bidirectionally effective brake B1. A further brake B2, not shown in FIGS. 1 and 2, has been illustrated in FIG. 3. Clutch K1, actuated in all forward positions, is directly connected to a source of fluid pressure, represented by a conduit 208, via extension conduits 208a and 208b. Shift valves 70 and 90 may be actuated manually or automatically, the latter in response to such parameters as the position of an accelerator pedal and the speed of the wheels or of the drive shaft of the vehicle; their respective inlet ports 240 and 241 communicate with a nonillustrated pressure regulator as more fully described in the above-identified patent. A conventional manual selector, also not shown, controls the admission of hydraulic fluid to the conduit 208 at a pressure which may vary with load, i.e. with the position of a nonillustrated accelerator.

Valves 70 and 90 are similar to each other and include each a piston 71 or 91 and a slider 76 or 98 integral therewith. The piston has two heads 71a, 71b or 91a, 91b whereas the slider has three heads 76a, 76b, 76c or 98a, 98b, 98c. The two piston heads 91a and 91b are somewhat different in diameter whereby hydraulic fluid such as oil, admitted under pressure to the intervening space through an inlet port 220a, tends to maintain the piston 91 and its slider 98 in the illustrated normal, left-hand position. Both pistons 71 and 91 are continuously urged toward the left by respective biasing springs 83 and 105 acting upon the heads 76c and 98c of their sliders; this action can be reinforced, under certain operating conditions not here material, by fluid entering their spring chambers through conduits 236 and 220d. Upon a shifting of the pistons to their off-normal positions, as illustrated for the valve 70, differential pressure can be exerted upon their differently dimensioned heads 71a, 71b and 91a, 91b by fluid arriving through respective conduits 236b and 221. The cylinders of these valves are further provided with ring channels 75 and 97 vented to the sump or the low-pressure side of a supply pump not shown, as indicated by V-shaped symbols in the drawing.

Slider 76, when retracted to the left, connects inlet 209 with an outlet 212 leading to brake B2 whereby that brake can be operated at low speed (first gear) in certain selector positions in which conduit 209 receives fluid. In the reverse position of the selector, in which conduit 208 is drained, fluid reaches the brake B2 directly from the selector over a path independent of valves 70 and 90; under these circumstances, clutch K2 is operated by fluid passing through the unshifted valve 90 from conduit 210 through a conduit 215. Clutch K2 is also operable in the shifted position of valves 70 and 90, i.e. at high speed (third gear), by fluid passing from conduit 208 through 1-2 shift valve 70 to a line 213 terminating at a ring channel 101 of the cylinder of 2-3 shift valve 90. In the illustrated shifted position of valve 70, which may be considered the basic position of that valve for purposes of the present description, line 213 continuously communicates with supply conduit 208 to receive high-pressure oil therefrom.

Two further ring channels 102 and 103 in the cylinder of valve 90 communicate with each other in the illustrated unshifted position of that valve, which may be referred to as an unblocking position since it permits the flow of high-pressure oil from a branch 214 of line 213 to the inlet 375 of brake B1 via a feeder line divided into two sections 403, 401; section 403 extends from a ring channel 157 of the housing of control valve 150, through an adjoining outlet, to a first port communicating with ring channel 102 whereas section 401 extends from an adjoining second port, communicating with ring channel 103, to the brake inlet 375 by way of a constriction 402. Branch line 214 terminates at two ring channels 153, 156 of control valve 150 which has a slider 151 provided with three axially spaced heads 151a, 151b, 151c. A boss 151d at the free end of head 151a maintains a certain clearance 152 adjacent that head in the retracted (left-hand) position into which the slider is urged by a biasing spring 162 bearing upon a disk 158 which is seated on a boss 151e projecting from the opposite slider end at head 151c. Spring 162 is partly received in a cup-shaped plunger 161 whose outer face confronts a space 164 within its cylinder 163 communicating with a conduit 166 via a branch 165 containing a constriction 165a. Conduit 166, which terminates at unidirectionally effective brake B1F, also has an extension 166b with a constriction 166a leading to clearance 152 behind slider head 151a. Two other branches 166c and 166d of conduit 166 enter the housing of the slider 151 via ring channels 154 and 257 which, in the illustrated off-normal slider position, communicate with two axial recesses respectively defined by the three heads 151a, 151b, 151c. Another ring channel 155, vented to the sump, lies next to the ring channel 156 which adjoins the channel 157 communicating with feeder-line section 403. An extension 214a of branch line 214, lying between ring channels 153 and 156, is provided with a constriction 400 designed to insure a sufficient supply of oil for brake B1F.

Also connected to the inlet 375 of brake B1 is a damper 370 whose housing 373 contains a plunger 371 loaded by a compression spring 372 so as to yield in response to an initial pressure buildup in line 401. Housing 373 is vented at 374, i.e. behind the plunger 371.

Finally, a conduit 222 terminating at plunger housing 163 behind the disk 151 carries fluid pressure which may be a function of some controlling parameter and which in this specific instance is assumed to vary in response to the position of the accelerator or gas pedal so as to rise with increasing loads while being always less than the supply pressure in conduit 208. Reference may also be made in this connection to commonly owned U.S. Pat. No. 3,583,422.

With the system of FIG. 1 in its low-speed position corresponding to first gear, insufficient fluid pressure is applied to valves 70 and 90 to displace them against the restoring force of their respective springs 83 and 105. Thus, only the clutch K1 is actuated at this time, conduit 210 being cut off from pressure by the selector in its forward position. As the vehicular speed sensed by the pressure regulator increases, piston 71 and slider 76 of valve 70 shift to the right whereby hydraulic fluid from supply conduit 208 reaches the line 213 and its branch 214. With the slider 151 of valve 150 initially in its normal position, in which the stop 151d contacts the left-hand end wall of its housing, the fluid in line 214 is free to flow at a relatively high rate into conduits 410 and 403 to fill up the brakes B1F and B1. With brake B1F filling slightly faster than brake B1 in view of the constriction 400, a reaction pressure develops in the feedback line 166b which drives the slider 151 into its illustrated off-normal position. In this unstable position the slider heads 151a and 151b, by alternately cracking open the ring channels 153 and 155, establish an equilibrium condition in which the fluid pressure in line 166 builds up gradually to a point where a component thereof, transmitted to plunger housing 163 via constriction 165a, suffices to displace the plunger 161 to the left against the force of spring 162 whereupon the plunger, acting through disk 158, restores the original normal position of slider 151. Reference in this connection may be made to commonly owned U.S. Pat. No. 3,593,599.

In the illustrated position of unstable equilibrium, line 403 is cut off from line 214 by the slider head 151b but communicates with line 166 through its spur 166d; thus, the same throttled fluid pressure acts at this stage upon brakes B1F and B1. If, now, the pressure in inlet 241 rises sufficiently to move the piston 91 of valve 90 to the right, i.e. to upshift the system into its high-speed position, piston head 98b cuts off the ring channel 102 and interconnects the two ring channels 103 and 104 whereby line 401 is vented to the sump at 104 so as to drain the brake B1 and the associated damper 370. This draining operation is independent of the position of slider 151 and will therefore also occur if the upshift follows a return of the slider to normal.

Figure 2:
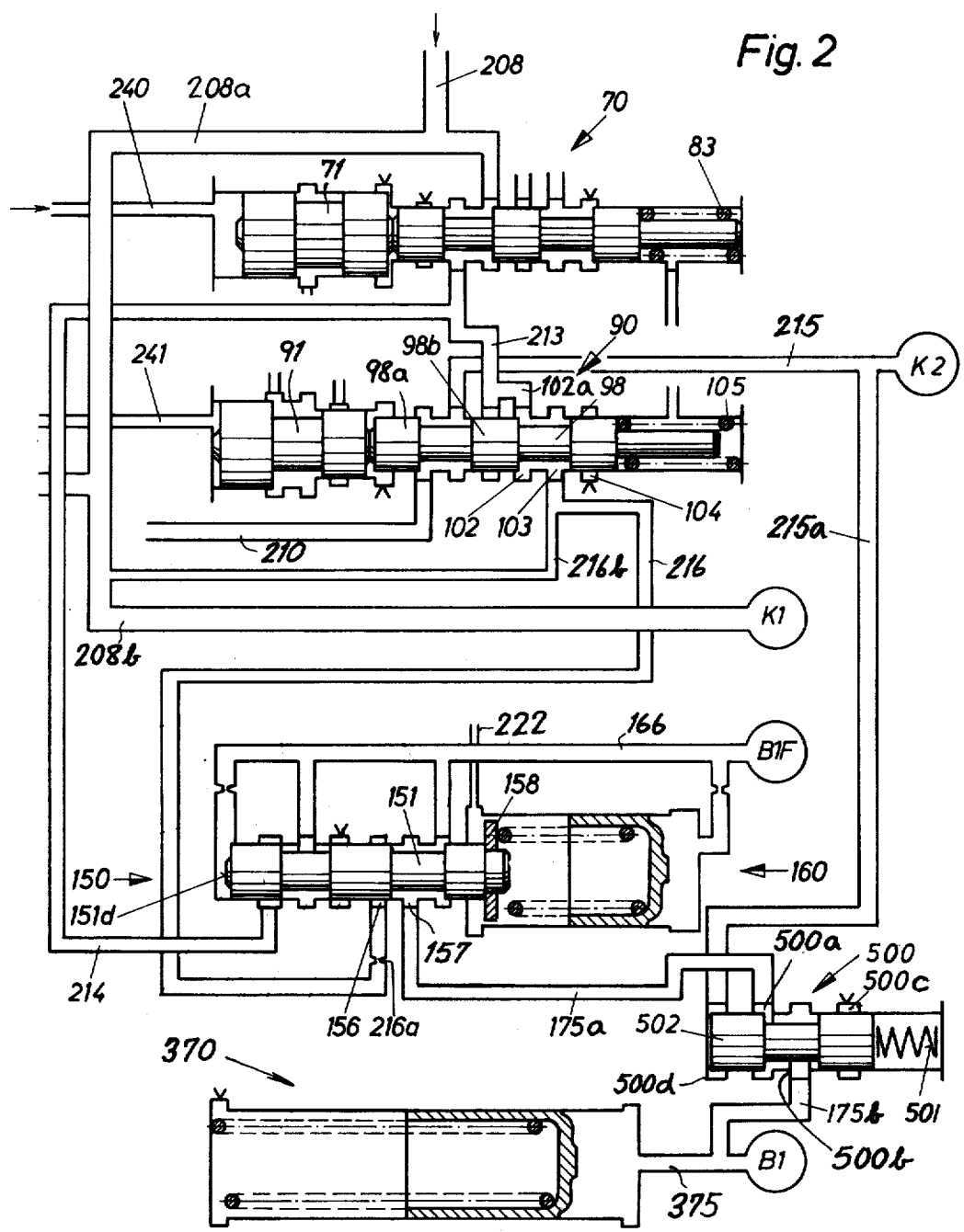
FIG. 2 is a view similar to FIG. 1, showing a modification.

The system of FIG. 2 differs from that of FIG. 1 by the provision of an ancillary valve 500 inserted between two sections 175a, 175b of the feeder line of brake B1: section 175a extends from ring channel 157 to a first port 500a of the cylinder of valve 500, whereas section 175b extends from a second port 500b thereof to brake inlet 375. A third port 500c is vented to the sump whereas a fourth port 500d communicates with a branch 215a of the feeder line 215 for clutch K2. Valve 500 has a piston 502 biased by a spring 501 into its illustrated position in which ports 500a and 500b are connected so that oil can flow from valve 150 through line sections 175a, 175b to brake B1 and damper 370.

Upon an upshift into third gear, the rightward displacement of piston 91 loads the clutch K2 as lines 213 and 215 are connected by the space separating slider heads 98a and 98b. The same fluid pressure now acts upon piston 502 which is thereby displaced to the right, against the restoring force of spring 501, to obstruct the line 175a while connecting the line 175b to the sump at 500c. Again, as in the preceding embodiment, the brake B1 and the associated damper 370 are drained under the exclusive control of the 2–3 shift valve 90 independently of the position of control valve 150.

The feeder line 401 of the brake B1 in FIG. 1 and the corresponding line 216 in FIG. 2 are provided with restricted branch lines 401a and 216b, respectively, which extend from the supply conduit 208b and serve to fill these feeder lines with oil at low pressure, further limited by the respective constrictions 402 and 216a, in the low-speed position (piston 71 retracted to the left) in which these lines are otherwise cut off from the fluid source working into conduit 208. This measure accelerates the actuation of brakes B1F and B1 upon a subsequent upshift.

Figure 3:
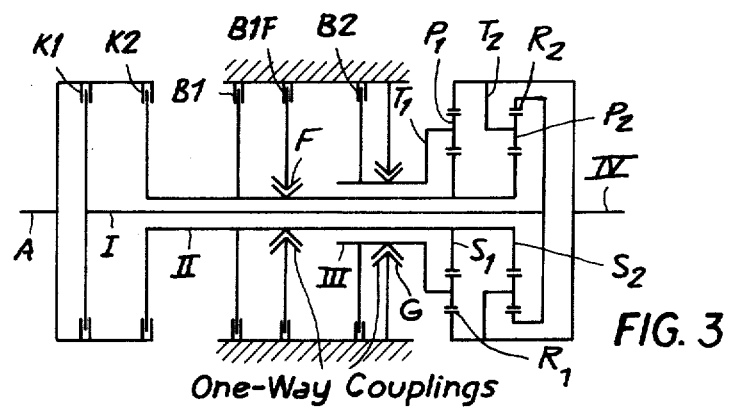
FIG. 3 is a diagrammatic representation of a planetary transmission system provided with clutches and brakes controlled in part by the mechanism of FIGS. 1 or 2.

In FIG. 3 we have shown additional elements of the planetary-gear transmission system served by the clutches K1, K2 and the brakes B1, B1F and B2. The system comprises an input shaft A, several intermediate shafts I, II, III disposed in nested coaxial relationship, and an output shaft IV. The clutches and brakes are schematically shown as including disks co-operating with hydraulically operable clamp jaws. Clutches K1 and K2 are actuatable to connect input shaft A with intermediate shaft I or II, respectively, brakes B1F and B1 serve to arrest the intermediate shaft II whereas brake B2 fulfills the same function with reference to shaft III. Brake B1F is rendered unidirectionally effective by the interposition of a one-way coupling F, such as on overrunning clutch, between its disk and the shaft II. A similar one-way coupling G prevents reverse rotation of shaft III independently of brake B2.

Two planetary-gear assemblies include respective sun gears, $S_1$, $S_2$ keyed to shaft II, a first ring gear $R_1$ keyed to output shaft IV, a second ring gear $R_2$ keyed to shaft I, and a pair of carrier disks $T_1$, $T_2$ supporting planetary gears $P_1$, $P_2$ respectively in mesh with gears $S_1$, $R_1$ and $S_2$, $R_2$. Planet carrier $T_1$ is rigid with shaft III whereas planet carrier $T_2$ is unitary with ring gear $R_1$.

The following Table summarizes the engaged (+) and disengaged (−) positions of clutches K1, K2, brakes B1F, B1, B2, and one-way couplings F, G in the three forward-speed positions "low", "intermediate" and "high" as well as in reverse:

|  | K1 | K2 | B1F | B1 | B2 | F | G |
| --- | --- | --- | --- | --- | --- | --- | --- |
| low | + | − | − | − | + | − | + |
| intermediate | + | − | + | + | − | + | − |
| high | + | + | + | − | − | − | − |
| reverse | − | + | − | − | + | − | − |

We claim:
1. In a fluid-operated load-control system, in combination:
first, second and third fluid-actuatable drive-establishing means for controlling the torque ratio of a vehicular transmission;
a supply line;
first valve means for connecting said supply line to a source of high-pressure fluid in a basic position and to a drain in an alternate position;
further valve means in tandem with said first valve means controlling the admission of fluid from said supply line to said first drive-establishing means;
second valve means in tandem with said first valve means controlling, jointly with said further valve means, the admission of fluid from said supply line to said second drive-establishing means, said further valve means being effective in a normal position to admit fluid at a relatively high rate from said supply line to said first and second drive-establishing means, said further valve means being effective in an off-normal position to throttle the fluid flow from said supply line to said first and second drive-establishing means, said second valve means having a downshifting position for cutting off the fluid flow to said third drive-establishing means and an upshifting position for cutting off the fluid flow to said second drive-establishing means;
fluid-feedback means extending from said first drive-establishing means to said further valve means for displacing same from said normal to said off-normal position upon incipient pressure buildup in said first drive-establishing means;
biasing means opposing displacement of said further valve means by said fluid-feedback means;
throttled conduit means extending from said first drive-establishing means to said biasing means for exerting thereon a force-increasing action re-establishing said normal position upon a predetermined rise in the pressure of the fluid admitted to said first drive-establishing means; and
drain means for said second drive-establishing means effective in said upshifting position of said second valve means independently of the position of said further valve means for preventing concurrent pressurization of all said drive-establishing means.

2. The combination defined in claim 1 wherein said first and second drive-establishing means are respectively provided with a first feeder line and a second feeder line, said fluid-feedback means including a branch of said first feeder line, said drain means being inserted in said second feeder line.

3. The combination defined in claim 2 wherein said further valve means comprises a housing provided with inlet means and with first and second outlets respectively connected to said first and said second feeder line, said outlets communicating with said inlet means in said normal position, and a slider in said housing disconnecting said second outlet from said inlet means and interconnecting said outlets in said off-normal position.

4. The combination defined in claim 2 wherein said drain means comprises a cylinder with a first and a second port and a piston slidable in said cylinder, said second feeder line being divided into a first section extending from said further valve means to said first port and a second section extending from said second port to said second drive-establishing means, said piston interconnecting said first and second ports in said downshifting position but obstructing said first port and connecting said second port to a drain in said upshifting position.

5. The combination defined in claim 4 wherein said first section is provided with a restricted connection linking same, at least in the normal position of said further valve means, to said source independently of said first valve means.

6. The combination defined in claim 4 wherein said cylinder and said piston are part of said second valve means.

7. The combination defined in claim 4 wherein said second valve means has a discharge port communicating with said supply line in said upshifting position, said discharge port being connected to said cylinder for shifting said piston against a restoring force acting thereon.

8. The combination defined in claim 7, wherein said third drive-establishing means is connected to said discharge port for actuation in said upshifting position.

9. The combination defined in claim 1 wherein said first drive-establishing means is a unidirectionally effective hydraulic brake and said second drive-establishing means is a bidirectionally effective hydraulic brake, said third drive-establishing means comprising a hydraulic clutch connectable by said second valve means to said supply line for actuation in said basic position of said first valve means and in said blocking position of said second valve means.

10. The combination defined in claim 9 wherein said transmission includes an input shaft, an output shaft and planetary gearing for selectively establishing a low, an intermediate and a high speed ratio between said shaft, said brakes being conjointly engageable with a movable element of said planetary gearing to establish said intermediate speed ratio, said clutch upon actuation coupling said movable element with said input shaft to establish said high speed ratio.

* * * * *